Figure 1:
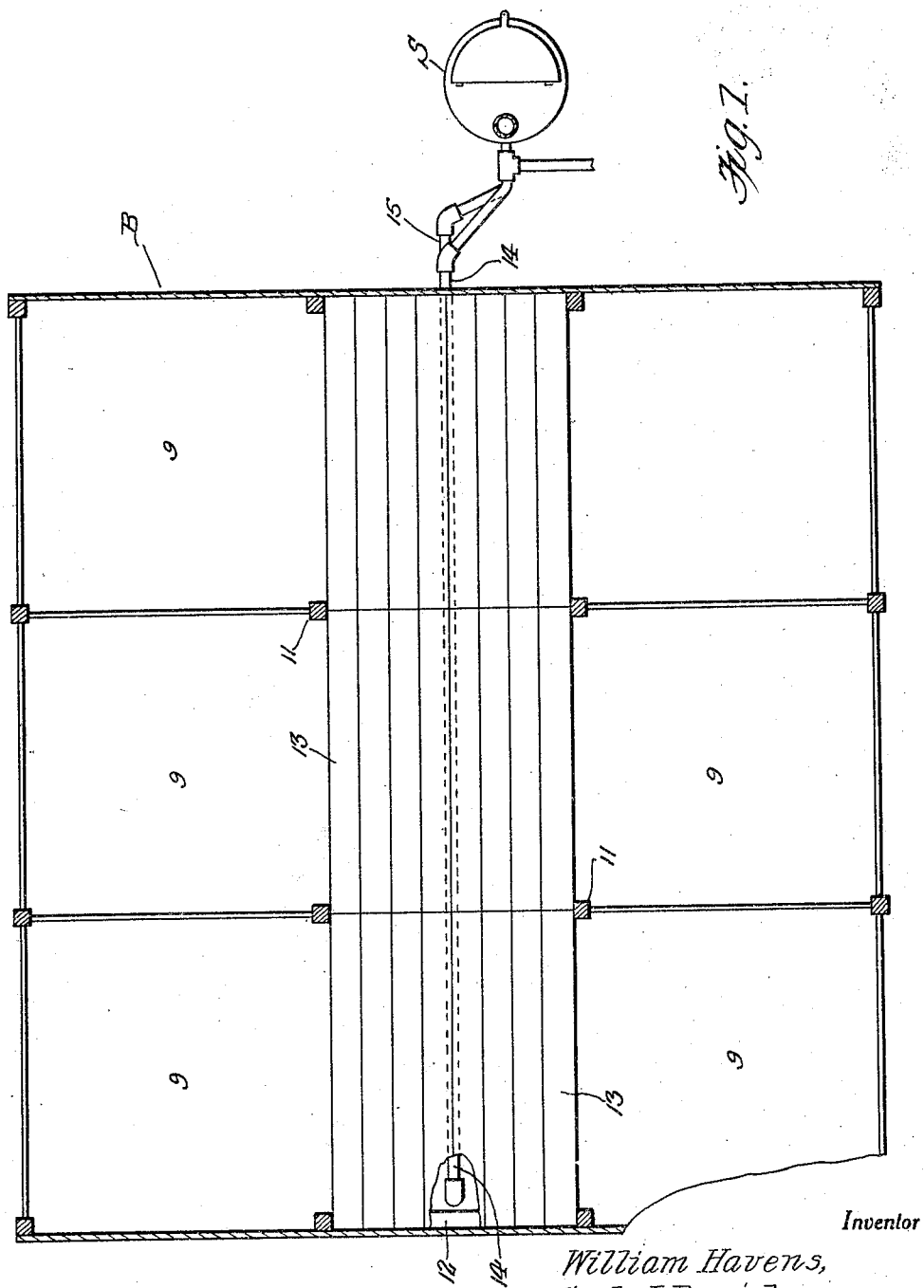

Aug. 30, 1932.　　　W. HAVENS ET AL　　　1,874,745
BROODER
Filed May 7, 1930　　　2 Sheets-Sheet 1

Inventor
William Havens,
Carl J. Danielson,
By Clarence A. O'Brien
Attorney

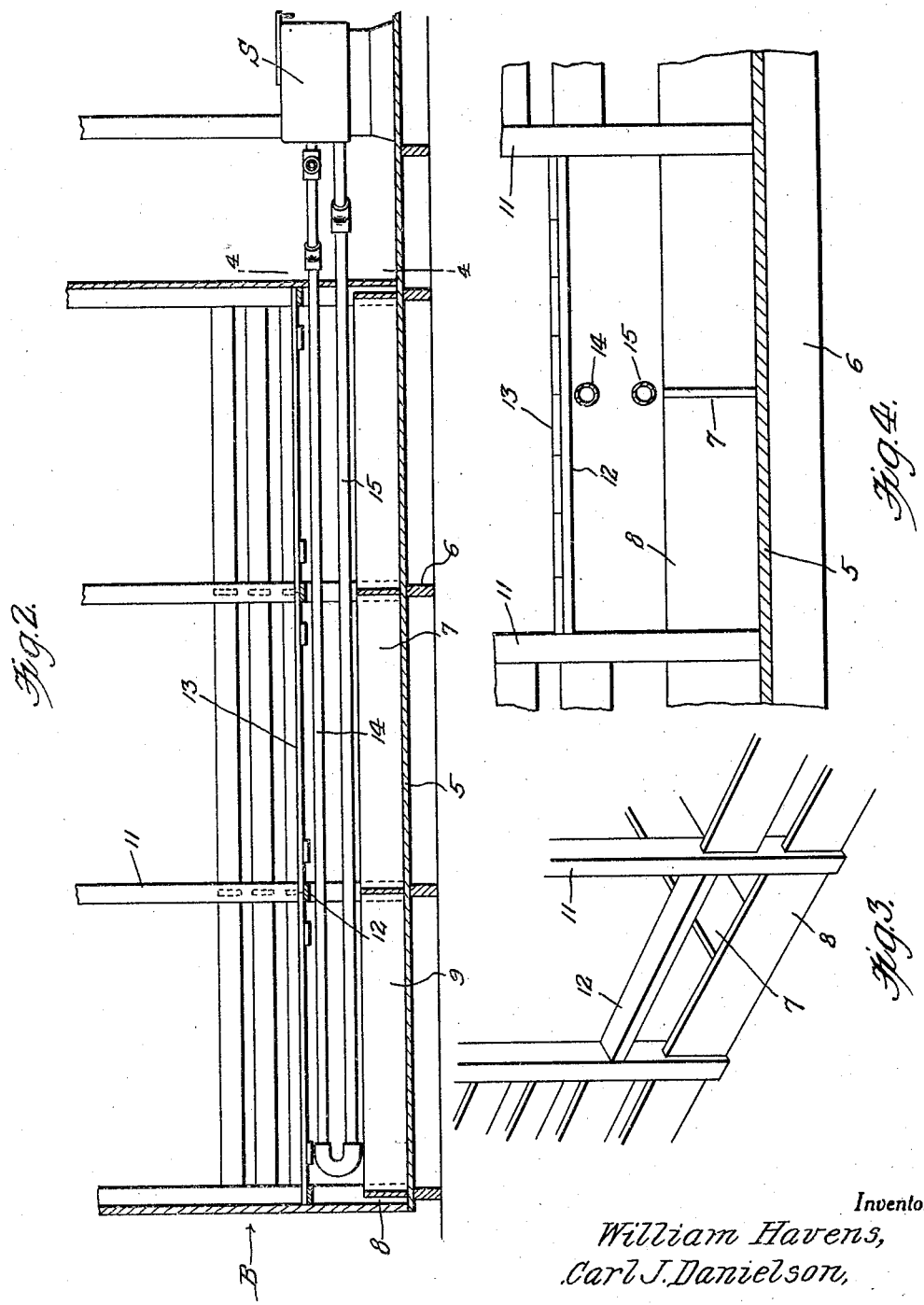

Patented Aug. 30, 1932

1,874,745

UNITED STATES PATENT OFFICE

WILLIAM HAVENS AND CARL J. DANIELSON, OF WAUBAY, SOUTH DAKOTA

BROODER

Application filed May 7, 1930. Serial No. 450,532.

This invention relates broadly to brooders, having more particular reference to a brooder for hogs.

A primary object of this invention is to provide a brooder including a plurality of pens, the arrangement of the pens being such that a hot water heating system, or like heating system may be used in conjunction therewith for heating any number of pens or heat compartments with which each pen may be provided; and further, as many heated compartments or pens as might be desired may be provided necessitating only the lengthening of the conduit through the brooder for conveying a heated fluid such as water, steam or the like through each of the pens or the heat compartment with which the pen may be provided as above referred to.

A still further object of the invention is to provide a brooder wherein the arrangement of the pen and heat compartment forming a part of the pen is such that the number of pens may be as desired without loss of any advantage as to the protection for the young pigs or other animals that might be housed in the heated compartment of the pen.

Other objects and advantages of the invention will become apparent during a study of the following description, taken in connection with the accompanying drawings, wherein:

Figure 1 is a horizontal sectional view taken through a brooder embodying the features of the present invention, Figure 2 is a vertical longitudinal sectional view taken through the brooder for more clearly illustrating the application of my invention, Figure 3 is a fragmentary perspective looking at one end of the brooder, the heating system not shown, Figure 4 is a detail view taken substantially on line 4—4 of Figure 2.

With reference more in detail to the drawings, it will be seen that we have shown a brooder somewhat fragmentarily and in section, the same being designated by the reference character B. In the main, the brooder consists essentially of a raised flooring 5 suitably supported on floor joists 6. Dividing the brooder into a plurality of pens 9 is a longitudinal partition wall 7 and transverse partition walls 8 extending laterally from opposite sides of the wall 7.

Rising from each of the partition walls 8 is a pair of uprights 11, each pair of uprights including one upright on one side of the wall 7 and a second upright on the other side of said wall 7. The uprights of the respective pairs are connected together by a transverse horizontal cross bar 12 above and parallel to said partition wall 8. (See Figure 2.)

Removably supported upon said cross bars 12 and arranged in end to end relation, are top members 13 which extend above the inner ends of the pens, providing for each pen at said inner end a heating chamber or compartment opening into its respective pen.

At the end of the brooder is a suitable heater, such as a stove S or the like, from which leads a plurality of spaced parallel pipes extending parallel to the longitudinal wall 7 between the upper edge of the wall and said top members 13. The said pipes provide for a continuous circulation of water, steam or other suitable heating element as may be desired, the said pipes being connected at the free end by a suitable U-coupling, one pipe 14 may be designated as the feed conduit and the other pipe 15 as the return conduit. It is of course to be understood, and as would be readily apparent to those skilled in the art, that one or more small radiators (not shown) may be arranged in the conduit in a manner thought apparent.

From the foregoing it will be seen that sows may be housed in the pens 9 and the young may gather in the heating chamber with which each pen is provided. The top members 13 form a continuous sectional walk extending for the full length of the brooder. Furthermore the arrangement is such that the younger pigs in the heating chambers or compartments will be fully protected against being trampled upon by the sows.

An advantage of a brooder of this character is that the brooder may consist of any number of pens, each having its own heating chamber, the heating conduit for the heating medium being readily lengthened as is apparent, without sacrificing any advantages as to the protection of the young pigs that might be kept in the heating chambers.

It is thought that from the foregoing description, taken in connection with the accompanying drawings a clear understanding of the utility, and simplicity of a brooder of this character will be had by those skilled without a more detailed description.

Even though we have herein shown and described the preferred embodiment of our invention, it is to be understood that the same is susceptible to changes fully comprehended by the spirit of the invention, and the scope of the appended claims.

Having thus described our invention, what we claim as new is:

1. A brooder house including a raised walk extending centrally longitudinally therethrough, supports for the walk, a plurality of pens on either side of and respectively terminating at one end centrally beneath the walk, and a heat radiating member extending centrally beneath the walk for the full length thereof above the ends of the respective pens.

2. A brooder house including a raised sectional walk extending longitudinally therethrough, a partition wall extending centrally under said walk, a plurality of partition walls at right angles to said first mentioned partition wall and defining pens terminating at one end centrally beneath the walk, certain of said pens extending beyond one longitudinal edge of the walk and the other of the pens extending beyond the opposite longitudinal edge of the walk, and heating means for said pens extending under said walk and above said central partition wall.

3. In a brooder, a raised sectional walk and supports therefor, a wall beneath said walk for the full length of the walk, additional walls extending laterally from opposite sides of the first mentioned wall to provide rows of pens at opposite sides of the walk, said walk and said walls providing at the inner end of each of said pens a compartment, a heat radiating element extending through the brooder beneath said walk above and parallel to the first mentioned wall.

4. In a brooder, a centrally extending partition wall, lateral partition walls extending from either side of said central wall and dividing the brooder into a plurality of pens, each of said pens including a heating chamber at the end thereof adjacent said central wall and opening into the pen, removable top members for the heating chambers, there being one top member common to the heating chambers of a plurality of adjacent pens, and supporting means for the top member, said top members being arranged in edge to edge relation to provide a walk extending through the brooder above said central wall, and a conduit for a fluid heating medium common to all of the chambers, extending through the brooder beneath said walk above and substantially parallel to said central wall.

In testimony whereof we affix our signatures.

WILLIAM HAVENS.
CARL J. DANIELSON.